UNITED STATES PATENT OFFICE.

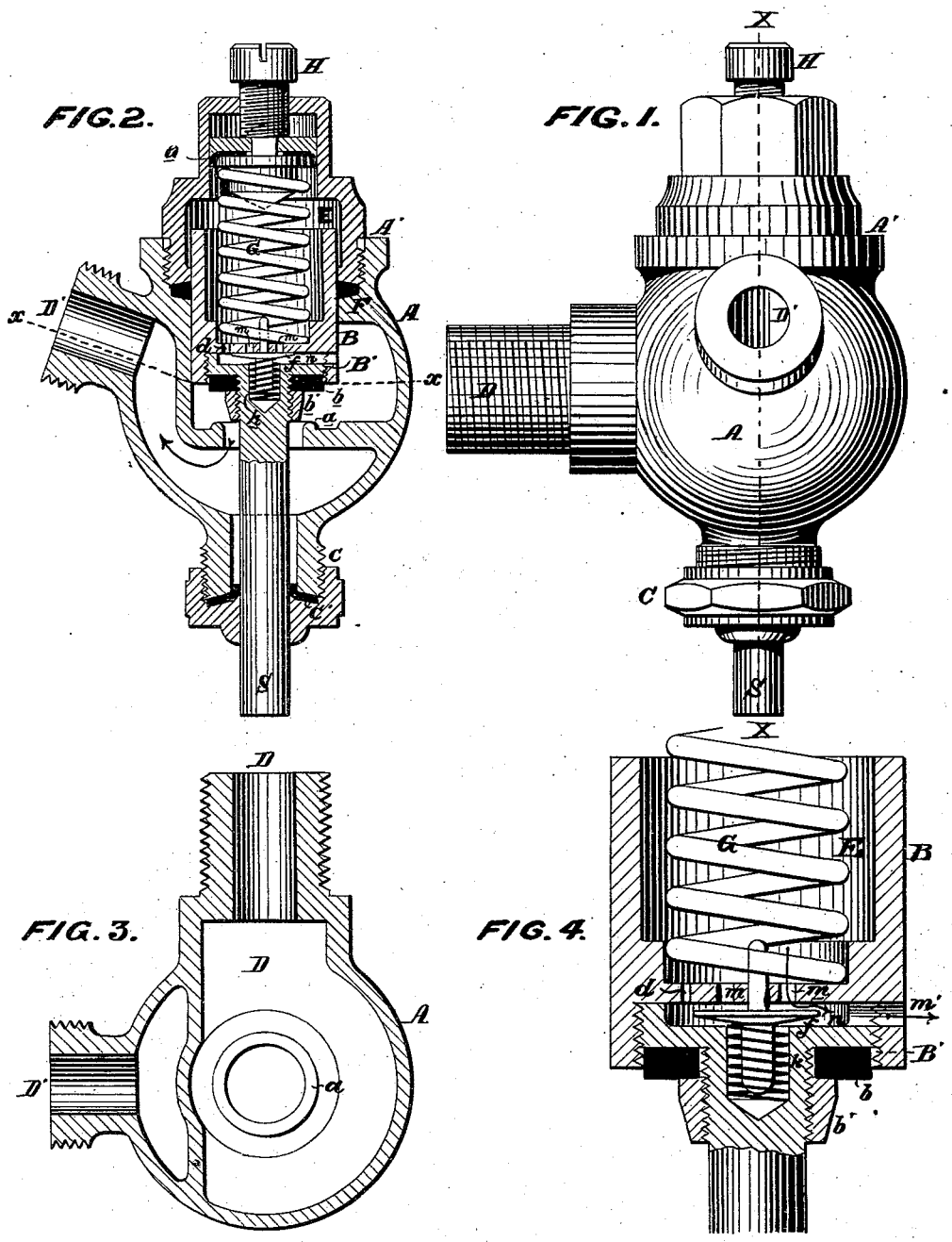

GEORGE R. MOORE, OF PHILADELPHIA, PENNSYLVANIA, ASSIGNOR OF ONE-HALF HIS RIGHT TO RICHARD McCAMBRIDGE, OF SAME PLACE.

IMPROVEMENT IN WATER-CLOSET VALVES.

Specification forming part of Letters Patent No. 161,977, dated April 13, 1875; application filed December 31, 1874.

*To all whom it may concern:*

Be it known that I, GEO. R. MOORE, of the city and county of Philadelphia and State of Pennsylvania, have invented Improvements in Water-Closet Valves, of which the following is a specification:

The object of my invention is to make an improved water-closet valve.

Figure 1 is a perspective view of the completed valve. Fig. 2 is a central section, taken horizontally in the line X X of Fig. 1. Fig. 3 is a transverse section, taken at right angles with Fig. 2 in the line $xx$. Fig. 4 is an enlarged view of the internal mechanism, the same as shown in Fig. 2.

A is the shell and frame-work in which the valve is made. It consists of two parts, which are screwed together at A', leaving an internal groove for packing between them, as seen at F. It is internally divided so as to afford suitable inlet and outlet water-ways and a valve-seat, $a$. B is a plunger, made in two parts, in this case, and screwed together at B'. It contains the valve with an elastic facing, $b$, confined by a screw-nut, $b'$, upon the valve-stem; also a small chamber, $n$, and the little valve $f$, two spiral springs, and certain water-ways to be hereinafter explained. C is the ordinary jam-nut upon the shell of the valve, and holding in place a fibrous or leather packing, C', around the valve-stem to prevent leakage at this point when the valve is open. D is the inlet, D' the outlet. E is a variable chamber contained in the plunger B, and the part of the shell A beyond the point where the packing F embraces the plunger B. This packing, F, is held against the plunger B by the two parts of the shell A when screwed together, and it will be seen that the recess for the packing is wider on the inside toward the plunger, so that, screwing the shell together tightens the packing to any desired extent, whether to make it tight or to retard the closing of the valve, as it will do by friction. This is one of the objects of providing for such a packing, that it may perform the double office of making a tight shell and at the same time be used to regulate the closing of the valve. Although almost any kind of fibrous leather or gum packing will do at this point, it should be such as works easily, uniformly, and prevents all leakage, either externally or past the plunger B. G is a spiral spring. H is a regulating-screw for adjusting the spring to suit varying pressures of water, and to prevent the well-known evil of jarring the pipes by the momentum of the water; also to adjust the closing of the valve to any desired time. All these objects are accomplished by this simple regulating-screw upon the spring.

The operation of this valve is as follows: Being closed upon its seat $a$, it is opened by pressure upon the end of the spindle S, in which movement the automatic valve $f$ opens to allow the water in the chamber E to pass out the apertures $m\ m\ m'$ toward the water-fountain or head, thus allowing the valve to open easier than is usual, as all that is provided for by the valve $f$ is additional to the constantly-open passage $d$, through which the chamber is again, in due time, filled. The closing of the valve is automatic. The two forces, co-acting, are the pressure of the spring G, and the re-establishing water-force in filling the chamber E through the aperture $d$. The valve $f$ is self-closed whenever the main valve moves toward its seat. It is undesirable that either of the above-named forces, co-acting to close the valve, should be sufficient of itself, for then it would be more difficult to regulate the closing to suit all conditions and requirements. The aperture $d$ should therefore be quite small, and if the valve is too long in closing, screw up the spring by the manual external screw H, and it will hasten the closing by increasing the pressure, and vice versa.

O is a movable seat for the spring G, provided with annular packing to prevent water-leakage around the screw H. $k$ is a small spiral spring and operates the valve $f$.

I claim—

1. A retard-valve, having in combination with the retard-chamber E, and spring G, located within the retard-chamber, a regulating-screw H, as and for the purpose herein set forth.

2. The small chamber n, furnished with the valve f, and the spring k, all in combination as and for the purpose herein set forth.

3. The movable spring-seat O, with annular water-tight packing within the valve-case A, in combination with the spring G, screw H, and retard-valve, as and for the purpose herein set forth.

GEO. R. MOORE.

Witnesses:
   J. PLANKINTON,
   JOHN MANUEL.